United States Patent [19]

Houle

[11] 4,142,686
[45] Mar. 6, 1979

[54] STRAW CUTTING MACHINE

[76] Inventor: Gratien Houle, Rte. 139, Wickham, Co. Drummond, Quebec, Canada

[21] Appl. No.: 847,500

[22] Filed: Nov. 1, 1977

[51] Int. Cl.² .......................................... B02C 13/286
[52] U.S. Cl. .............................. 241/101.7; 241/186 R; 241/277
[58] Field of Search ................ 241/101.7, 186 R, 186, 241/189 R, 224, 277

[56] References Cited

U.S. PATENT DOCUMENTS

| | | | |
|---|---|---|---|
| 3,129,739 | 4/1964 | Wenger | 241/186 R X |
| 3,483,906 | 12/1969 | Moeller | 241/186 R X |
| 3,912,175 | 10/1975 | Anderson | 241/101.7 X |
| 4,033,515 | 7/1977 | Barcell et al. | 241/189 R X |
| 4,066,216 | 1/1978 | Waldrop et al. | 241/101.7 X |

Primary Examiner—Howard N. Goldberg

[57] ABSTRACT

A machine for cutting straw from a bale of compressed straw and which is particularly adapted to avoid jamming of the rotatable cutters and to allow displacement of the machine for use in any desired location and to eject the cut straw in any desired direction. This straw cutting machine comprises a body having a top provided with a series of slots and also provided with cutters mounted on a shaft placed underneath and transversely to the body of the machine such that, when the cutters are rotating they project through the slots. The bale of straw to be cut is inserted into an upstanding tube open at both ends which turns about its vertical axis. The bottom face of the bale of straw rests on the body top and is engaged by the cutters which chop the straw and lift the bale against its own weight. The cutters sweep against the entire bottom face of the bale of straw because the cutter is turned by the rotating tube. The jamming of the cutters is avoided because there is no shearing of the straw since the surfaces of the cutters are spaced from the edges of the slots. This straw cutting machine is mounted on wheels for manual displacement of the machine. It is also provided with an opening to allow for the selective directional ejection of the cut straw, the latter being ejected by the cutters.

6 Claims, 5 Drawing Figures

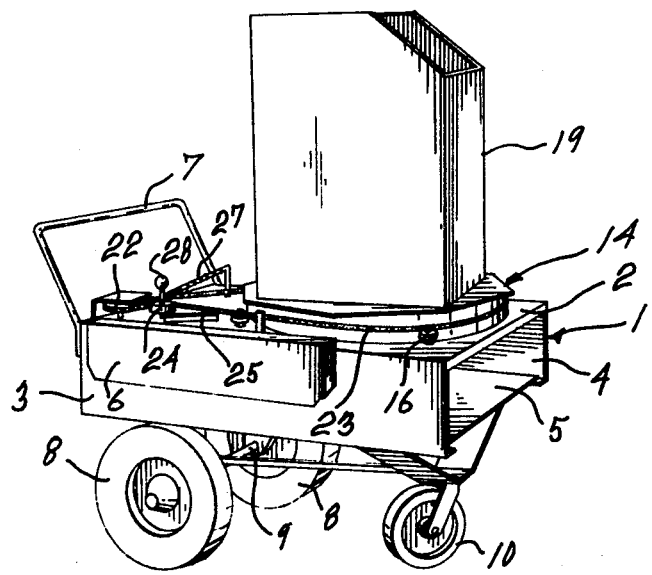
Fig-1
Fig-3
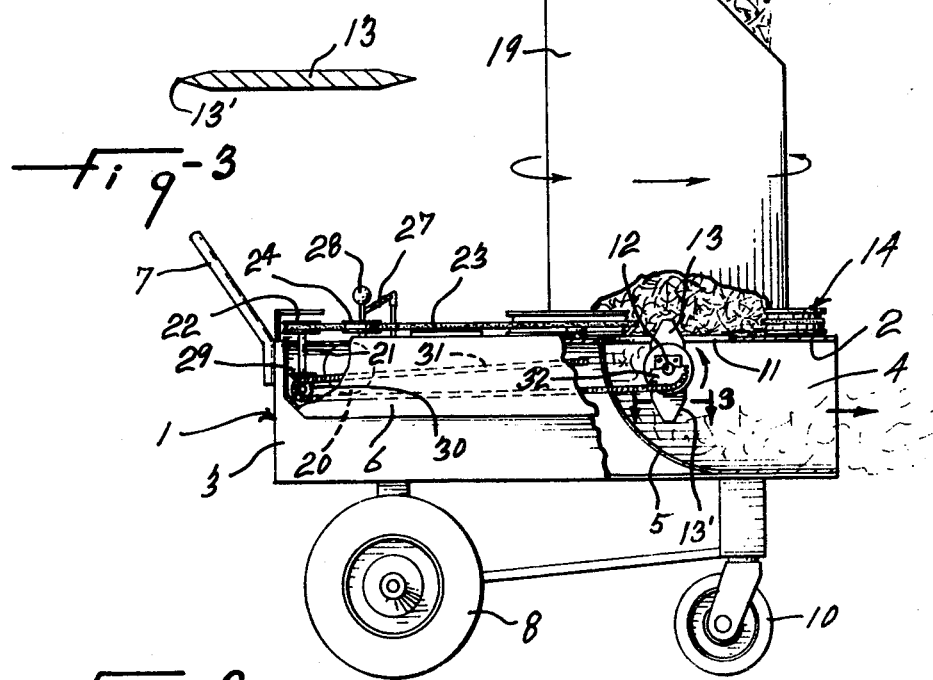
Fig-2

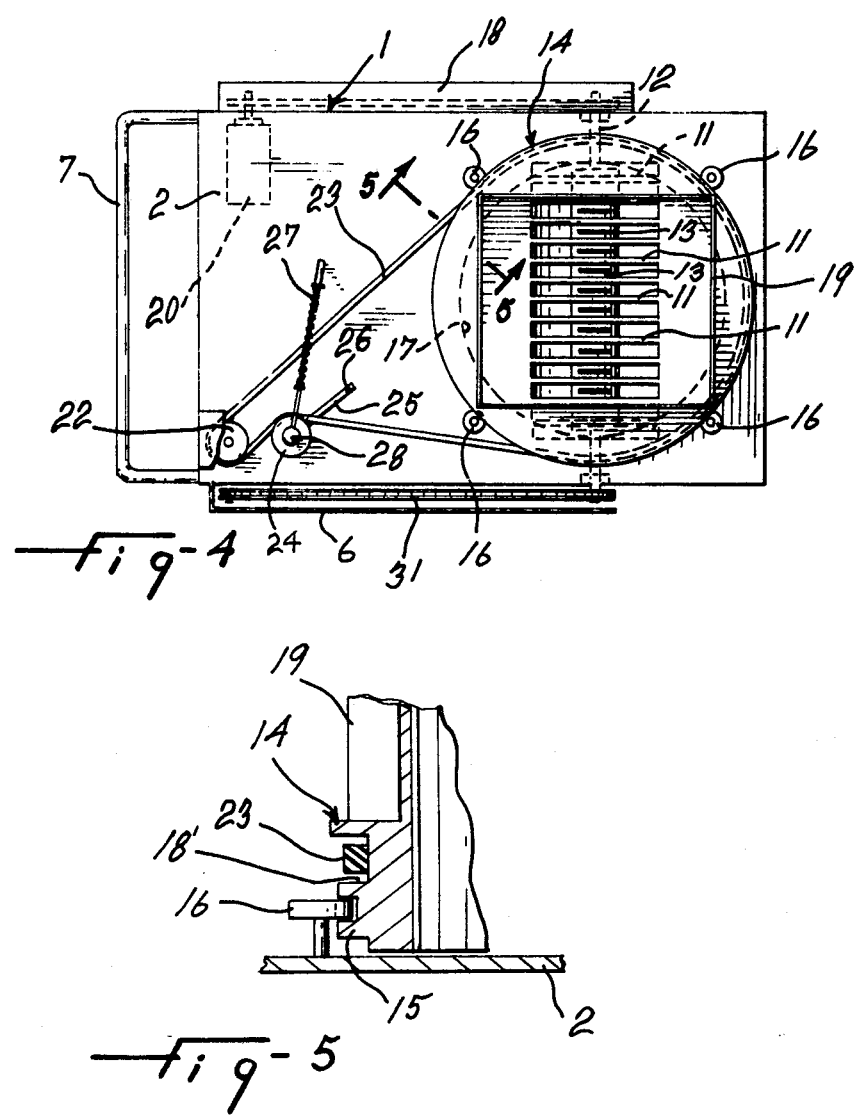

STRAW CUTTING MACHINE

This invention relates to a straw-cutting machine equipped to cut grain stock straw as well as straw made from poor quality hay.

Straw is presently used to make litter for farm animals such as cows, calves and birds, as for example chickens. Ordinary straw or grain straw serves this purpose except that it at times prevents proper functioning of the stable cleaning system or the automatic manure disposal. For example ordinary straw makes piles whose height increases rapidly particularly when the weather is cold, as in winter. Straw cutting machines have previously been proposed in which cutting was done by a shearing action. It was discovered that shearing is undesirable because it resulted in the jamming of straw between the movable cutters and the fixed elements of the cutting assembly.

Accordingly it is a general object of the present invention to produce a straw-cutting machine which minimizes jamming and the stopping of the movable cutters.

Another object of the present invention is to produce a straw cutting machine which may be easily displaced for use in any desired area and which can eject cut straw in any desired direction. This permits the laying down of a uniform layer of hashed straw wherever desired.

The above mentioned objects as well as other objects and advantages of the present invention will be more clearly understood by referring to the following detailed description and by referral to the following preferred embodiment of the present invention illustrated by way of the accompanying drawings in which:

FIG. 1 is a perspective view of the straw-cutting machine according to the present invention.

FIG. 2 is side view, partially sectioned of the machine in FIG. 1.

FIG. 3 is a sectional view of a rotating blade as seen along line 3—3 of FIG. 2.

FIG. 4 is a top view of the same machine.

FIG. 5 is a view taken along line 5—5 of FIG. 4.

The illustrated machine includes a body 1 of generally hollow rectangular construction including a top 2, opposed lateral sides 3, an ejection opening 4 with the end facing frontward and an internal deflector 5 which forms a passage for the ejection of the straw along with the sides 3 and the top 2. The body 1 is provided with a chain guard 6 fixed to the exterior of one side 3 and also with a tubular handle bar 7 attached to the exterior and back of body 1 so that the machine may be pushed manually. The machine itself is displacable on a pair of rear wheels 8 attached to a common axle 9 and also on a swivelling front wheel 10.

Top 2 is provided with a series of parallel slots 11. A shaft 12 is rotatably mounted in body 1 transversely thereof; shaft 12 extends below and transversely of the parallel slots 11. A series of cutters 13 are fixed on shaft 12 so that they turn in unison with shaft 12 and such that each of the cutters is opposite a slot 11. Each cutter 13 is elongated, having sharp cutting edges 13' formed by its converging opposite sides. The cutters 13 are thinner than the width of slots 11 and are not in contact with the edges of the slots 11. Each cutter 13 penetrates into a slot 11 and surpasses the top 2 surface of top during approximately 120° of its rotation.

A turntable 14 is rotatively mounted on body 1 in overlying relationship with parallel slots 11 and cutters 13. Turntable 14 includes a vertical tube 19, rectangular in cross-section and fully open at its two ends and an annular section 15 which is fixed to and encircles the lower end of tube 19. Annular section 15 is formed with an external peripheral groove in which are engaged four wheels or idlers 16 serving as guide wheels to rotatively guide and support turntable 14. Annular section 15 defines a passage or opening 17 registering with slots 11 and cutters 13 and which is wide enough to expose all of the straw contained within vertical tube 19 to the cutters 13 and to leave room for the cutters 13. The longitudinal axis of tube 19 as defined by the intersection of its diagonals, intersects the axis of cutter shaft 12.

Tube 19 communicates with opening 17 of annular section 15 for bodily rotation therewith. Tube 19 is adapted to slidably receive, guide and contain a bale of compressed straw uprightly and in such a manner that it rests freely under its own weight on top 2 such that it is cut by the cutters 13 while the bale is turning around a vertical axis relative to the cutters 13.

A motor 20 is attached to the inside of body 1 and powers shaft 12 of the cutters 13 by means of a transmission 18 consisting of a belt and pulleys. The other end of shaft 12 includes a sprocket gear 32 which drives a chain 31 which in turn is connected to sprocket gear 30 driving upright shaft 21 by means of bevel gear 29. A pulley 22 is fixed on vertical shaft 21 for rotation in unison with shaft 21 and is located above top 2. A belt 23 engages pulley 22 and also a circumferential groove 18' (see FIG. 5) in turntable 14 to rotate the latter. An idler pulley 24 turns about an arm 25 which is pivoted at 26 into engagement with belt 23 to functionally tense the latter under the action of a tension spring 27. A hand-lever 28 is placed on the top end of the shaft of the idler pulley 24 to selectively displace pulley 24 against the action of spring 27 to stop the rotation of turntable 14.

It is to be noted that the cutters 13 are all aligned in the same diametrical direction relative to their common shaft 12.

As shown is FIG. 2 a bale of straw 33 is first of all placed in the tube 19. The motor 20 produces both the rotation of the cutters 13 and of the bale of straw 33 since it is within tube 19.

The cutters 13 successively sweep across the whole lower face of the bale of straw 33 due to the rotation of tube 19. The row of cutters 13 extend from a point facing a corner of the bottom surface of the bale of straw to at least the longitudinal axis of tube 19 so that the entire bottom surface of the bale of straw is swept by the cutters 13 at each full rotation of tube 19. The cutters 13 lift the bale of straw in a repeated fashion against its weight and the cutting edges of the cutters 13 engage the bottom of the bail and hash the straw. The cutting edges 13' of the cutters 13 engage the bale in a principally upward movement and then subsequently transversally relative to the bottom of the bale thus hashing or chopping the straw. There is no shearing and consequent jamming of the straw against fixed elements because the cutters 13 are spaced apart from the edges of slots 11. The hashed straw is drawn by the cutters 13 through the slots 11.

The deflecting plate 5 is curved toward the bottom of body 1 for ejection of the straw which has been cut. The cut straw is ejected by the cutters 13 through the open end 4 at the front of body 1. This front end is thus a horizontal outlet for the cut straw.

What I claim is:

1. A manually movable straw cutting machine serving to dinsintegrate and hash the straw from a bale of compressed straw in the form of a block, said machine comprising a body, a handbar fixed to said body, support wheels and a steering wheel mounted underneath said body for supporting and steering the same by means of said handbar, said body having a top and side walls, said top being normally in horizontal position and provided with a row of narrow straight slots substantially parallel and slightly spaced one from the other, a tube fully opened at both ends and mounted upright on said top in register with the row of slots, guide means mounted on said top to support said tube in an upright position while allowing said tube to rotate about its longitudinal axis, said tube defining guiding surfaces engageable with the side faces of a bale of compressed straw inserted within said tube, said guiding surfaces allowing downward sliding movement of said bale of straw under its own weight until the bottom surface of said bale of straw rests on said top, but preventing rotation of said bale of straw relative to said tube, power means mounted in said body to rotate said tube about said longitudinal axis, a shaft mounted in said body and disposed underneath and substantially parallel to said top and transversely to said row of slots, said shaft being perpendicular to and intersecting the longitudinal axis of said tube, a series of parallel spaced-apart radial cutters secured to said shaft and each in register with one of said slots, said cutters being thinner than the width of said slots, power means to rotate said shaft, said cutters, when rotating, passing through said slots without contacting the edges of said slots and projecting above said top to engage and cut the straw and eject the cut straw underneath said top, said body also forming underneath said top a curved passage in communication at one end with said slots and opening at the other end at the exterior of said body by means of a discharge opening made in one of said side walls of said body, whereby the straw cut by said cutters is directly ejected by the latter through said passage and said discharge opening, said series of cutters extending along said shaft through a radius of the circular path described by the radially outermost corner of the bottom surface of said bale of straw, during rotation of the latter, whereby said cutters sweep the entire bottom surface of said bale of straw during each complete rotation of said tube.

2. A machine as claimed in claim 1, wherein said guiding surfaces of said tube form a passage of rectangular cross-section.

3. A machine as claimed in claim 2 wherein said series of cutters extend along said shaft through the diameter of said circular path.

4. A machine as claimed in claim 3 wherein said means to support said tube in an upright position includes a ring member fixed to and surrounding the lower end of said tube, one means to guide and support said ring member for rotation above said top, said ring member also serving as a pulley for rotation of said tube by said first named power means.

5. A machine as claimed in claim 1 wherein each cutter is composed of two diametrically opposed radial branches, each branch having at least one cutting edge which converges towards the central radial axis of the branch in a direction towards the outer end of said branch.

6. A machine as claimed in claim 1 wherein said power means to rotate said tube and said power means to rotate said cutter bearing shaft include a motor, a transmission between said motor and said shaft and a second transmission between said shaft and said tube whereby said motor drives said tube in rotation about its longitudinal axis simultaneously with the rotation of said cutters.

* * * * *